(12) United States Patent
Baldwin (10) Patent No.: US 10,844,734 B2
(45) Date of Patent: Nov. 24, 2020

(54) CERAMIC TURBINE VOLUTE (71) Applicant: ICR Turbine Engine Corporation, Hampton, NH (US)

(72) Inventor: Matthew Stephen Baldwin, Exeter, NH (US)

(73) Assignee: ICR TURBINE ENGINE CORPORATION, Hampton, NH (US)

(*) Notice: Subject to any disclaimer, the term of this patent is extended or adjusted under 35 U.S.C. 154(b) by 0 days.

(21) Appl. No.: 16/379,522

(22) Filed: Apr. 9, 2019

(65) Prior Publication Data

US 2019/0234221 A1 Aug. 1, 2019

Related U.S. Application Data (63) Continuation of application No. 15/149,582, filed on May 9, 2016, now abandoned.

(60) Provisional application No. 62/158,224, filed on May 7, 2015.

(51) Int. Cl.
| | | |
|---|---|---|
| F01D 9/02 | (2006.01) |
| F01D 25/00 | (2006.01) |
| F01D 25/14 | (2006.01) |
| F01D 25/26 | (2006.01) |
| F01D 25/24 | (2006.01) |
| F02C 6/12 | (2006.01) |
| F04D 29/42 | (2006.01) |

(52) U.S. Cl.
CPC .......... *F01D 9/026* (2013.01); *F01D 25/005* (2013.01); *F01D 25/145* (2013.01); *F01D 25/24* (2013.01); *F01D 25/243* (2013.01); *F01D 25/246* (2013.01); *F01D 25/26* (2013.01); *F02C 6/12* (2013.01); *F04D 29/4286* (2013.01); *F05D 2220/40* (2013.01); *F05D 2230/642* (2013.01); *F05D 2300/21* (2013.01); *F05D 2300/2108* (2013.01); *F05D 2300/2112* (2013.01); *F05D 2300/2261* (2013.01); *F05D 2300/2283* (2013.01); *F05D 2300/5024* (2013.01)

(58) Field of Classification Search
CPC .......... F01D 9/026; F01D 25/24; F01D 25/26; F01D 25/243; F01D 25/246; F01D 25/145; F01D 25/005; F02C 6/12; F04D 29/4286

See application file for complete search history.

*Primary Examiner* — Kenneth J Hansen
*Assistant Examiner* — Behnoush Haghighian
(74) *Attorney, Agent, or Firm* — Sheridan Ross P.C.

(57) ABSTRACT

A gas turbine and nozzle system is provided that includes a radial inflow turbine rotor and a volute providing a flow path to deliver a pressurized gas to a circumference of the radial turbine rotor. The volute incorporates a shape which substantially conforms to a radial turbine shroud contour. The volute includes at least first and second parts. A mating surface between the first and second parts is substantially aligned with a direction of pressurized gas flow in the volute.

20 Claims, 8 Drawing Sheets

1. Thermal Barrier
2. Volute Half
3. Volute Half
4. Turbine
5. Clamp Tube
6. Wave Springs
7. Bellows
8. Cooling Manifold
9. Turbine Housing
10. Thermal Barrier
11. Turbine Housing
12. Bearing housing

1. Thermal Barrier
2. Volute Half
3. Volute Half
4. Turbine
5. Clamp Tube
6. Wave Springs
7. Bellows
8. Cooling Manifold
9. Turbine Housing
10. Thermal Barrier
11. Turbine Housing
12. Bearing housing

CERAMIC TURBINE VOLUTE

CROSS REFERENCE TO RELATED APPLICATION

This application is a continuation of application Ser. No. 15/149,582, filed May 9, 2016, which claims the benefit of priority under 35 U.S.C. § 119(e) to U.S. provisional application Ser. No. 62/158,224 filed May 7, 2015. The aforementioned application is incorporated herein by reference in its entirety.

FIELD

The disclosure relates generally to gas turbine engines and particularly to radial inflow turbine engines

BACKGROUND

This disclosure relates generally to small gas turbine engines with features directed to various innovations including ones relating to the use of ceramic components within the high-temperature turbine section of the engine. This particular disclosure is particularly applicable to radial inflow turbine which employ a free-vortex-type or so-called 'nozzle-less' volute to deliver the hot gas to the turbine rotor inlet. The volute employs a prescribed circumferentially converging geometry to cause the flow entering the turbine tip to have a substantially tangential velocity component around the periphery of the turbine rotor.

Increasing gas turbine engine firing temperatures has a direct effect on engine cycle efficiency. A high pressure radial turbine stage has been developed to operate at temperatures beyond the practical range of metals with uncooled turbine blades. The temperatures are known to those skilled in the art to be in the range of about 1000° C. to about 1400° C. These operating conditions require that the turbine rotor and static hot section components be composed of ceramic components. The components are installed in an internally insulated metallic case keeping the ceramics hot and isothermal, while the metallic case is relatively cool to contain high pressure within the engine. The design must survive the thermomechanical stresses, be held securely in the metallic housing, and seal the exhaust portion of the turbine.

Figure 1:
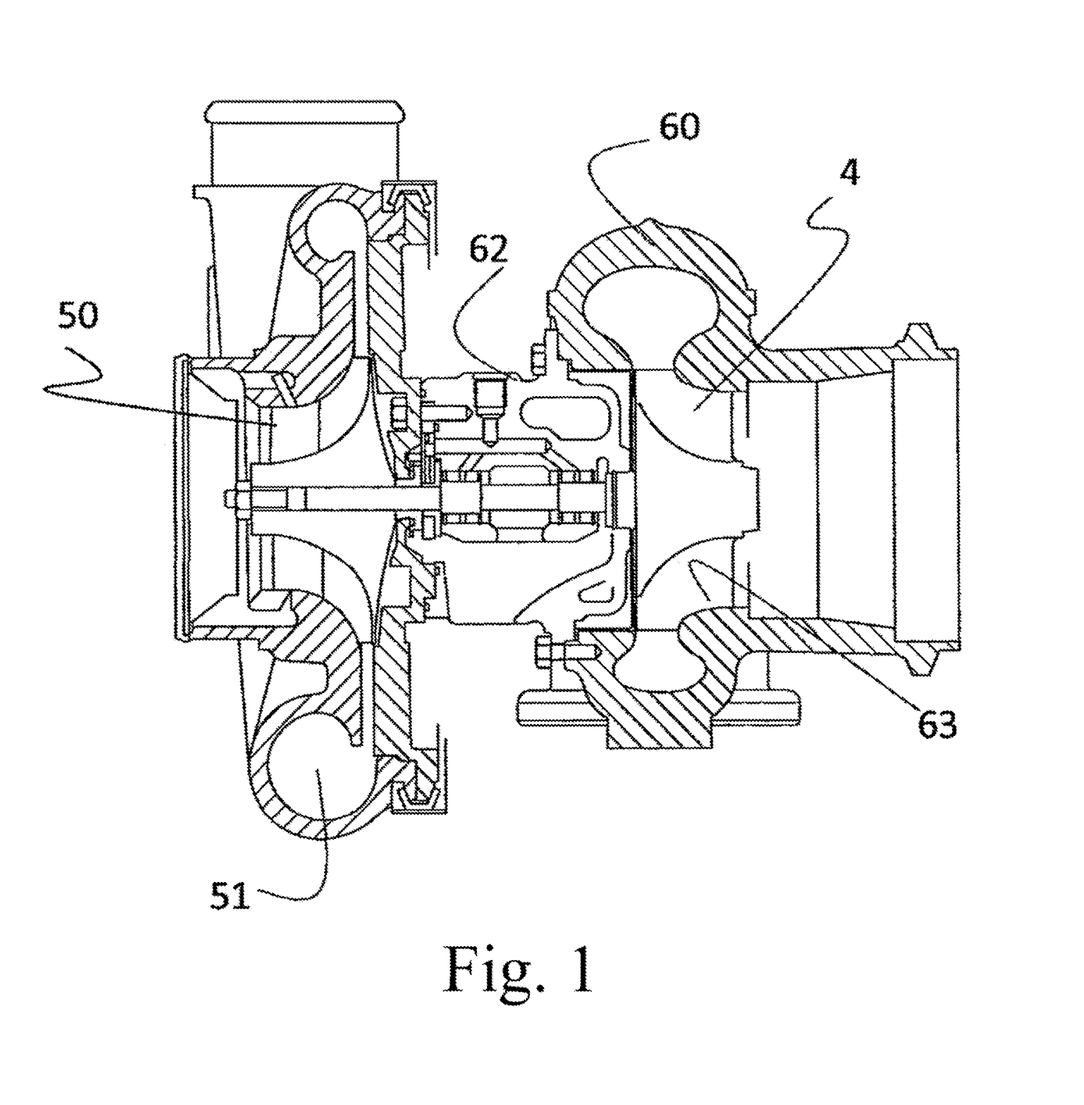
FIG. 1 is a cross-sectional drawing of the state-of-the art turbocharger with metallic turbine rotor and free vortex nozzle-less volute housing.

Commonly radial turbines are lower temperature and have metallic components with well-established methods of securing components, managing thermomechanical stresses and sealing. FIG. 1 shows a cross-sectional drawing of a common turbocharger. In a lower temperature metallic turbine section, such as one used in a microturbine or a turbocharger 61, the turbine volute 60 is a cast element; bolted on one side to the bearing core 62. The single piece volute is commonly described as a 'nozzle-less' volute or turbine housing. In this common arrangement the volute is a single piece casting with internal aerodynamic geometry, bolting features, and designed for elevated internal turbine inlet gas pressure. The shape of the internal flow passage is defined to have a converging cross sectional flow area to maintain a nearly uniform velocity around the circumference of the turbine entrance tip. Additionally angular momentum of the flow generates an incidence angle at the rotor tip to impart a torque on the turbine. In conventional radial turbines, this volute is a single piece casting which extends to and conforms to the shape of the turbine shroud line 63. The shroud line 63 is the surface of revolution that separates the rotating turbine rotor 4 from the static volute 60. Maintenance of tight operating clearances between these parts is essential to achieving high aerodynamic efficiency. The survivability of this part is dependent on the ability of the volute to tolerate high thermal and pressure stresses. The internal pressure places the volute in tensile stress. The tensile pressure stress is dictated by the difference between the internal and external pressure within the volute. The thermal stress is associated with the natural temperature gradient caused by the expanding fluid through the turbine rotor and the necessity to seal the hot gas by affixing the volute to the cold bearing core.

SUMMARY

These and other needs are addressed by the various aspects, embodiments, and/or configurations of the present disclosure.

The present disclosure relates to a multi-piece (e.g., 2 piece) ceramic volute and the mounting scheme into an internally insulated metallic case. The volute can direct and accelerate combustion gases at the proper velocity and angle into and through the turbine. The volute is separated into first and second parts or portions (e.g., first and second halves) to reduce thermomechanical stresses developed in the volute during start-up transients and from the steady state temperature drop through the turbine as work is extracted from the gas flow.

A multi-piece volute can allow for small relative movement between the parts or portions, rather than requiring the ceramic to manage differential thermal growth internally within a single component.

The volute can be mounted on a thermal isolator ceramic ring to maintain the component at as constant a temperature as possible. The thermal isolator also can assist preventing conduction of heat into the metallic turbine housing and bearing housing.

The aft end volute half can also be isolated with a similar ceramic ring to keep it at as constant a temperature as possible and prevent heat conduction into the aft end metal structures of the engine. The cross section of the volute can also be very thick to help conduct away heat and reduce thermal gradients in the material to keep thermal stresses low.

Typical bolting methods to secure the volute may not be successful due to the very low coefficient of thermal expansion of ceramics versus metal bolting materials. Also metallic fasteners can quickly lose their desirable properties at the elevated operating temperatures of the engine.

The assembly can alternatively be clamped together with a series of wave springs that are installed on the aft end of the turbine housing. The aft end of the housing can be relatively cold and exposed to ambient conditions allowing the springs to survive and operate without relaxing. The springs can accommodate differential growth between the internal components and the housing while maintaining sufficient clamping. Inboard of the clamp tube is a bellows that can act to seal the high pressure from the low pressure side of the turbine. The bellows does this while accommodating differential thermal growth of the housing and static hot section components. The bellows is cooled with bleed air to ensure it survives while interfacing with very hot ceramic components. The pressure loading of the clamped assembly can be carefully balanced to ensure adequate clamping of the static structures throughout the operating range of the engine.

These and other advantages will be apparent from the disclosure.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation m accordance with 35 U.S.C., Section(s) 1.12(f) and/or 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure may take form in various components and arrangements of components, and in various steps and arrangements of steps. The drawings are only for purposes of illustrating preferred embodiments and are not to be construed as limiting the disclosure.

FIGS. 7a,b show a radial pin-slot arrangement to allow differential thermal growth while maintaining concentricity.

DETAILED DESCRIPTION

While not intending to be limitative, the subject disclosure provides a heat exchange device which is particularly well suited for high temperature and pressure applications.

Figure 2:
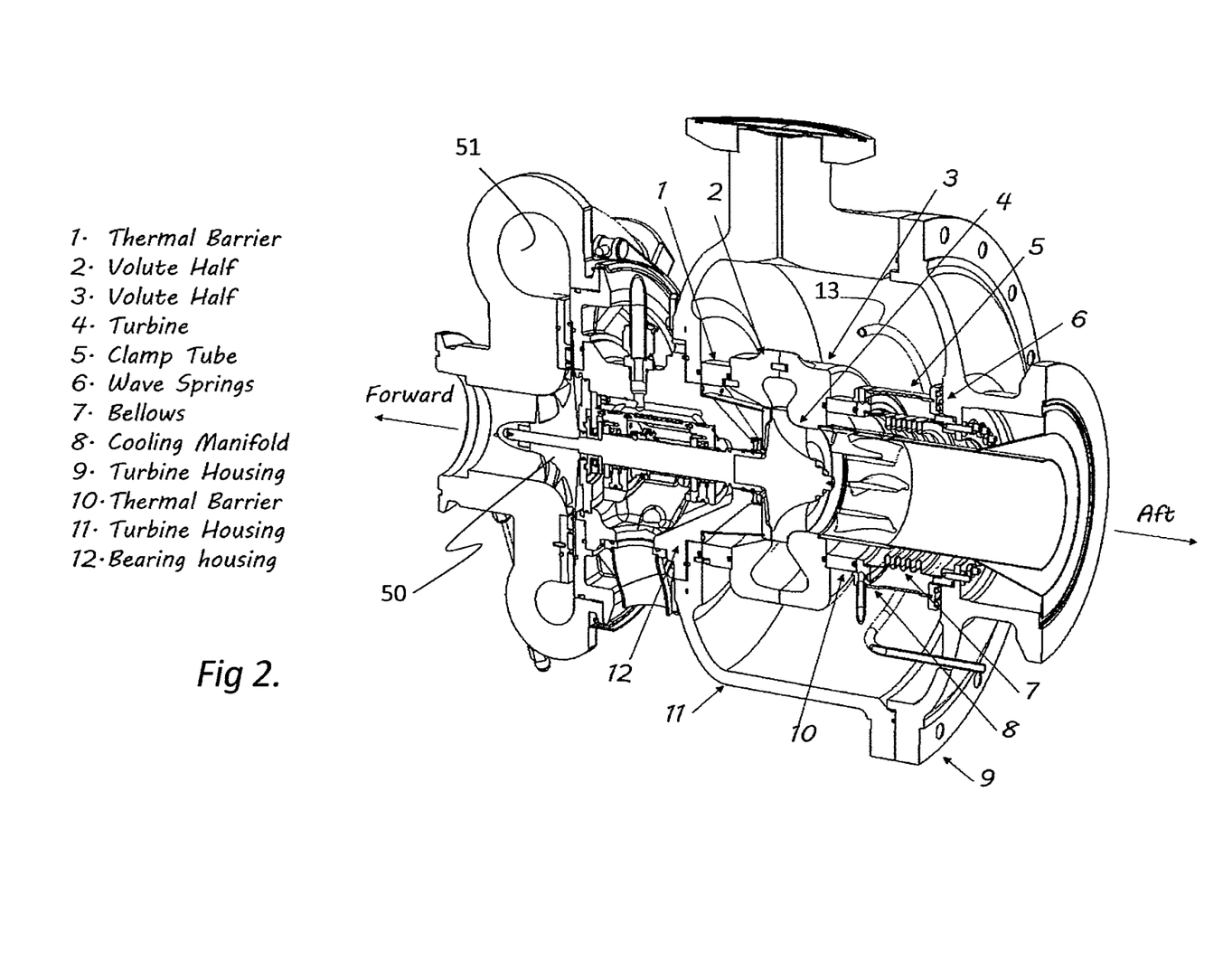
FIG. 2 is an isometric view illustrating the subject disclosure, showing the split ceramic volute and method of sealing and thermal stress management.
Figure 6:
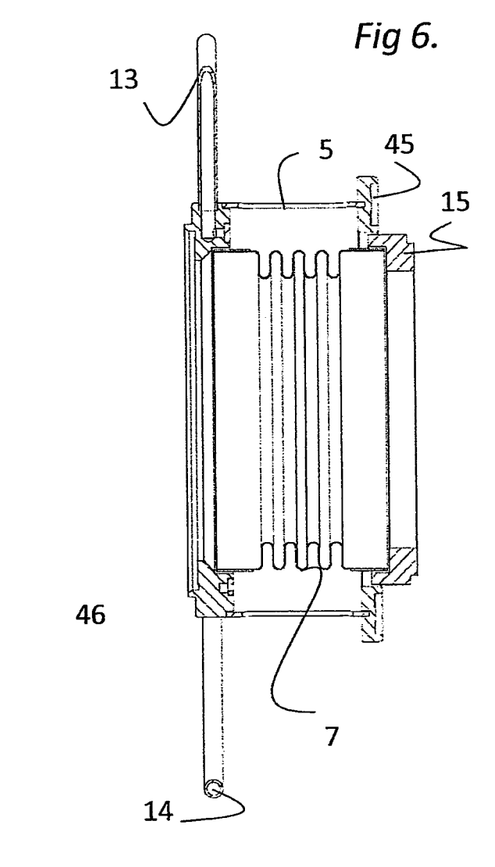
FIG. 6 shows a metallic bellows assembly employed to assist the sealing of the assembled parts during operation.

With reference to the drawings, wherein like reference numerals are used to depict like or similar components throughout the several views, FIG. 2 and FIG. 6 show a turbine and compressor assembly in accordance with an exemplary embodiment. The first half of the turbine volute 2 is combined with the second half 3 to form a turbine volute or nozzle. The nozzle half includes the aerodynamic flow path formed when mated to the first ceramic half 2, while conforming closely to the rotating ceramic turbine rotor 4. Maintenance of tight clearance between the shroud incorporated into volute half 3 and the turbine rotor 4 can be important to the efficient performance of the turbine. The first half 2 fits tightly under a clamping force to a first rigid insulating ring 1. The first rigid ring 1 forms a thermal barrier between the ceramic volute half 2 and the cooled metallic bearing core 12. The bearing core is fastened to the metallic pressure housing 11. The turbine housing 11 is designed to support the internal gas pressure within applicable safety margins. The second ceramic volute half 3 bears on the second rigid ceramic thermal barrier ring 10. The rigid thermal barrier ring in turn bears on the clamp tube 5 which is integrally bonded, welded or braized to a flange with an internal cooling manifold 8. The clamp tube is deposed between the cooled flange 8 thereby transmitting an axial clamping force through the turbine end cover 9. A wave spring 6 or other spring device is deposed between the clamp tube 5 and the metal cover 9. A channel feature may be routed into the thermal barrier ring 10 to capture or prevent radial misalignment with the cooling manifold flange 8. The cooled flange manifold 8. A second load path is connected to the cooling manifold 10 through a corrugated metallic bellows 7 to the turbine housing end cover 9. For clarity, the bellows 7 contains flanges on both ends; one with the cooling features 8 and the other of a conventional nature to attach to the turbine housing end cap 9. Blanket-type refractory fibrous or pliable insulation (not shown) is packed in the volume between the metallic pressure-bearing housing 11 and 9, and the ceramic elements 1,2,3,10 and outboard of the clamping tube 10.

Figure 3A:
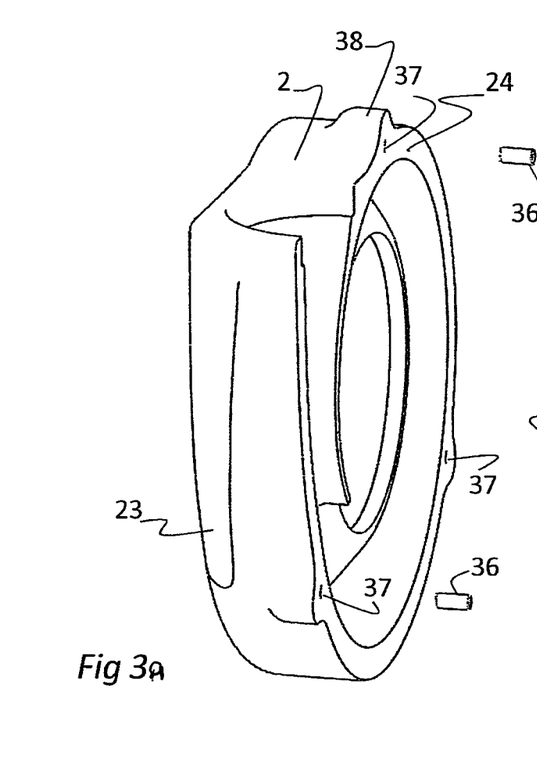
FIGS. 3a,b illustrate the split volute, showing the pins which can maintain alignment and serve to lower the thermal stress between the split halves.
Figure 3B:
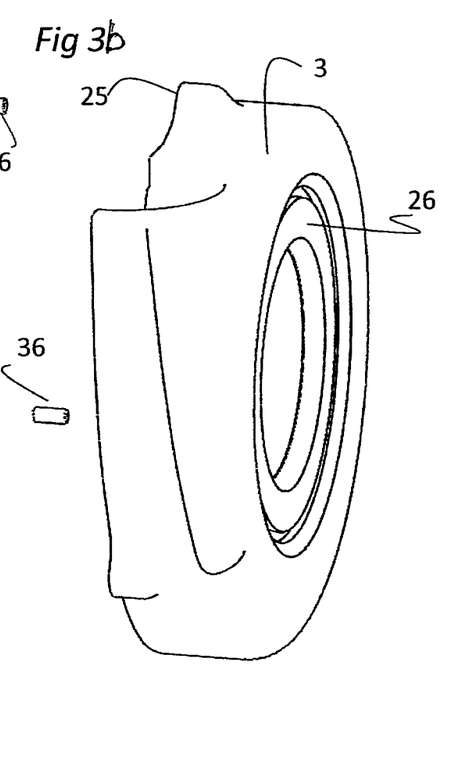
Figure 4:
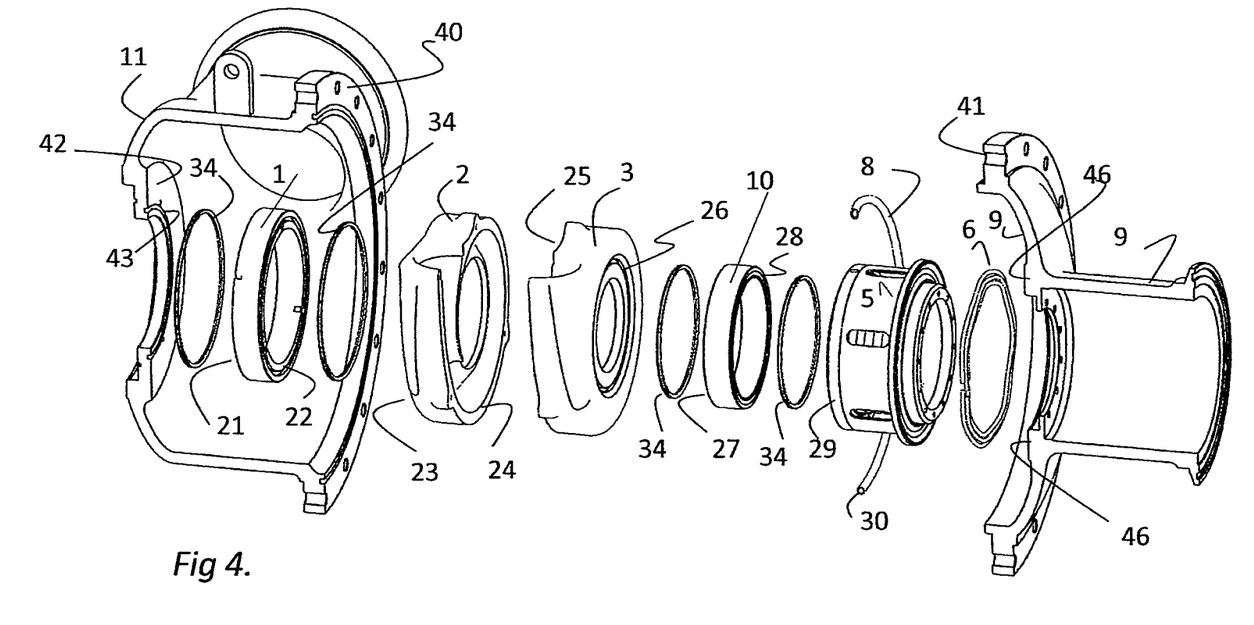
FIG. 4 shows an exploded view of the turbine hot section showing the clamping path for sealing and maintaining structural integrity
Figures 7A, 7B:
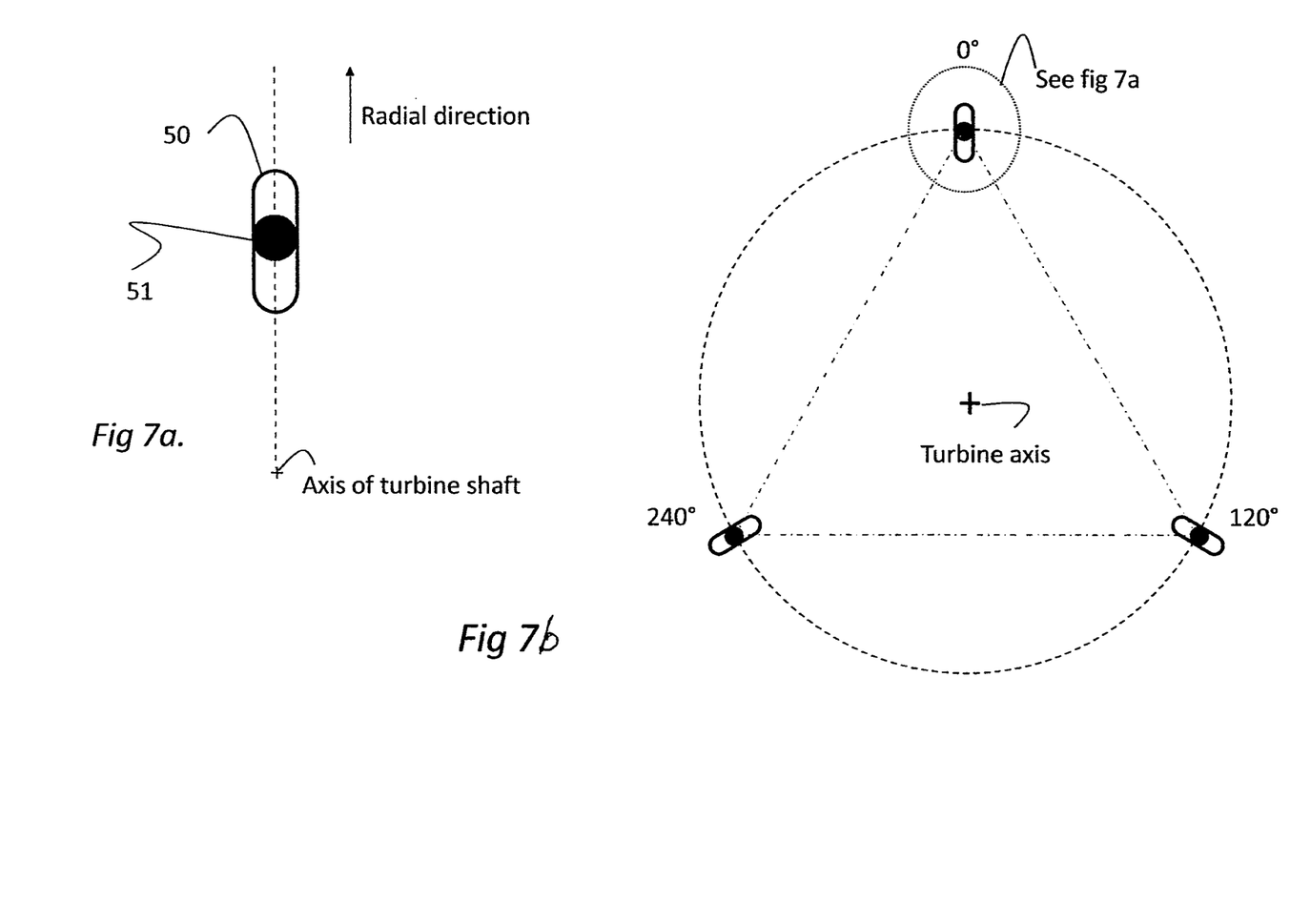
Figure 8:
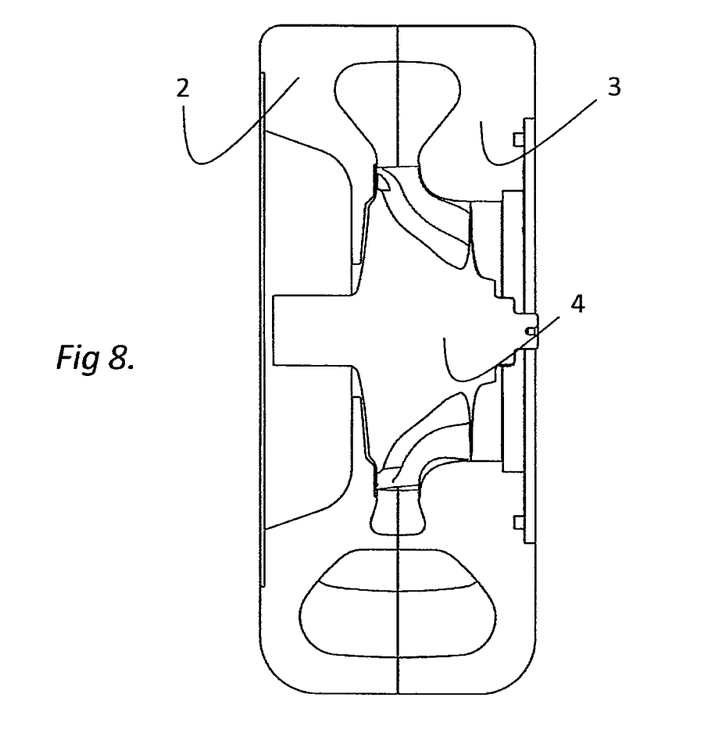
FIG. 8 shows an alternative turbine arrangement according to an embodiment.

FIG. 4 is an isometric view illustrating the subject disclosure, showing the split ceramic volute and method of sealing and thermal stress management. The ceramic volute is composed of two halves, where the bearing core side, first half of the turbine volute 2, is located by surface 23 against the ceramic insulator ring and includes a mating surface 24. The ceramic volute half, or second half of the turbine volute 3, is formed to include the contour of the radial turbine shroud, with mating surface 25. The mating surfaces 24 and 25 are ground to be smooth to enable proper sealing. With reference to FIG. 8, the mating surfaces 24 and 25 can incorporate a dowel pin arrangement where, for example mating surface 24 contains a hole positioned at 0, 120, and 240 degrees around the circumference of the sealing ring land. Mating surface 25 of the mating part would then contain a slot at precisely the same angular positions, with the slot oriented with its longer dimension along an axis perpendicular to the axis of the turbine rotor rotation. The slot shall have a width which is precisely matched to the diameter of the hole in the mating part. FIG. 7 illustrates this principal, where the hole in surface 24 is set in the radial location such that its axis is adjacent to the mid-position of the slot. In assembly, three precision dowel pins 36 are set into the three holes at 0, 120, and 240 degrees. FIG. 7 provides clarity of this principle. The two ceramic volute halves are then located together, contacting at their mating surfaces 24 and 25 respectively, and positioned radially and circumferentially by the dowel pins 36. This pin and slot arrangement is important to enabling independent thermal growth of the ceramic halves, which operate at different temperatures. As the parts expand and contract due to differential heating, the axis of the volute halves is unchanged, thereby maintaining the necessarily tight clearance control between the ceramic volute 3 and the turbine rotor 4. As an obvious alternative to the example described above, the holes may be placed in the ceramic volute half 3 and the slots may be placed in ceramic volute half 2. As shown on FIGS. 3a,b, protruding 'ear-like' 38 features may be integrated into the mating parts to facilitate assembly and improve structural integrity.

FIG. 4 presents an exploded view of the housing and volute assembly. Housing 11 serves as the pressure containment for the assembly. A flange 40 or V-Band or other traditional joining method is employed to seal the housing to the turbine end cover housing 6 with its integral flange 41 or V-band. For explanatory purposes, the following assembly description starts from the left to right in the exploded view, but this is not intended to imply the only means of assembly. Housing 11 is fastened to a turbomachinery bearing core, not shown. O-ring or gland or gasket 34 is located in a feature or groove machined into housing 11. A matching groove or feature 43 may be ground into thermal isolator ring 1. A three pin hole and slot arrangement previously described may also be implemented in the insulator ring 1 and sealing surface 42. The second surface 22 of the insulator ring 1 must include a three hole and slot and dowel pin arrangement as previously described and illustrated in FIG. 7. A second O-ring, or gasket 34 is employed to assist in the sealing between the insulator ring 1 surface 22 and the surface 23 of the ceramic volute half 2. Ceramic volute 2 with its surface 24 is mated to surface 25 of ceramic volute half 3. A third sealing ring or gasket 34 is located between volute half 3 and surface 26, and surface 27 of the thermal insulator ring 10. Surface 28 of thermal insulator ring is sealed to the clamp tube 5 at surface 29. Due to the insulating capability of thermal isolator ring 8, surface 28 operates at a temperature substantially lower than that of the ceramic volutes 1 & 2. The temperature of the mating surface 29 of the clamp tube 5 is controlled to allow for a forth seal or gasket 34. A tubular manifold 30 may be affixed to the clamp tube 5 end in the vicinity of surface 29 to provide active cooling. Pressurized cooling air taken from the gas turbine's compressor 50 (FIG. 2) from discharge 51 (FIG. 2) delivered to the cooling manifold 8 at inlet 30 is designed to provide cooling. The cooling fluid may be discharged to the interior volume enclosed between the pressure housings 11 & 9, and the ceramic volutes 2 & 3. This rejected cooling air would percolate through the housing and eventually enter the inlet of the ceramic volute formed by the two halves 2, 3. Since this flow is not vented downstream of the turbine, the performance penalty to the thermodynamic cycle of the engine is very small. The entire stack of components and their respective surfaces 43, 21, 22, 23, 24, 25, 26, 27, 28, and 29 are clamped together by two forces, firstly, the clamp tube 5 with wave spring 6, grounded to turbine end case 9, at surface 46 and secondly, by the bellows 7 (FIG. 2). The wave spring 6 and the clamp tube are not intended to provide any sealing, as the pressure on the inside and outer diameter are equal at all times. The principal purpose of the wave spring and clamp tube are to fix the axial position of the assembly when the engine is not operating. During operation, the bellows is sized to generate a significant axial thrust, compressively loading the stack-up of parts 5, 10, 3, 2, 1 against housing 11 and surface 43. This significant load serves to minimize leakage through the surfaces 43, 21, 22, 23, 24, 25, 26, 27, 28, 29, while also maintaining a compressive load on the ceramic parts. It is well known to those skilled in the art that ceramic materials have high compressive strength to tensile strength ratios. Furthermore, the ceramic volute halves 2 & 3 and the thermal spacer rings 1 & 10 are designed to have thick cross-sectional dimensions to avoid buckling.

The previously described stack-up is desirable as the structure is tolerant to thermal stress. The slip planes, 43, 21, 22, 23, 24, 25, 26, 27, 28, 29 enable the parts to have low stress during their independent thermal growth. Furthermore, the pneumatic effect of the bellows avoids the rigid constraints of a metal clamping arrangement, and propensity for high stress. This axial pneumatic pressure load is established by the natural pressure gradient through the turbine. Varying the bellows diameter provides a means of prescribing the desired axial compressive force.

Figure 5:
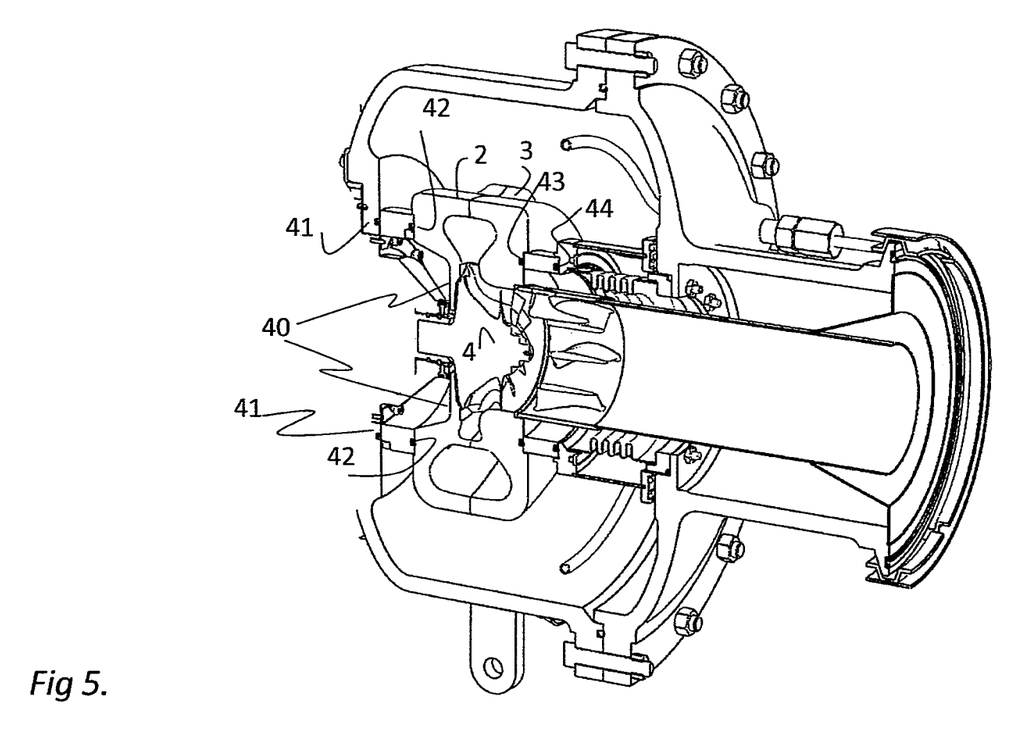
FIG. 5 illustrates an alternative turbine arrangement that can improve aerodynamic efficiency within the split housing disclosure.

FIG. 2 provides an isometric view of the turbine assembly end, with special attention to an additional benefit of the disclosure. In splitting the volute in the manner described, it is possible to extend the back plane of the volute to a lower radius 40 then would otherwise be possible with a state-of-the-art turbine housing. In FIG. 5 the ceramic volute half 2 incorporates the feature of an integral turbine back-plate 40. When the turbine rotor is inserted through the first ceramic half 2, it may be aligned with close proximity to the backplate 40. Maintaining a tight clearance (<<1 mm) between the rotating turbine blade of the turbine rotor and the static backplate near the tip (outer diameter) of the radial turbine is known to improve its efficiency. This objective could not be met in a state-of-the-art turbine housing, such as shown in FIG. 1 since the turbine rotor must be inserted from the bearing core end of the housing. In the disclosure the rotor may be inserted from the turbine exit end of the turbomachine through the first volute half 2, with the second volute half 3 mounted in succession. With this sequence of mounting the first half 2, then inserting the turbine rotor, then mounting second volute half 3, the turbine rotor 4 is essentially trapped within the closed volute. In this arrangement, the static and rotating geometry may be defined to provide tight clearance control on both the turbine shroud and the turbine backplane along a radius from slightly greater than the shaft diameter to the outer diameter tip of the rotor, FIG. 8. This feature is known to maximize turbine aerodynamic efficiency.

FIG. 6 provides a cross-sectional view of the bellows assembly 7 and clamp tube 5, with cooling manifold 13. Sealing surface 45 is designed to interface with turbine housing 6 at sealing surface or land 46 (FIG. 2). The clamp tube may also be a series of axial rods, as it is not intended to seal a differential pressure. Bellows 7 is designed to operate such that volume out-board of the diameter is at the higher turbine inlet pressure, while the volume in-board of the diameter operates at the lower turbine outlet pressure. The diameter of the bellows is set to produce a net axial load tending to stretch out the bellows, thereby loading the ceramic elements 1, 2, 3, 4 in compression during operation. The bellows conforms to the normal design principles of commercially available products, in this case, formed from a high temperature nickel or stainless steel alloy.

Contrary to the state-of-the-art single piece turbine housing, the two-piece ceramic volute operates with compressive pressure asserted by the combined influence of the elevated external pressure, and compressive axial force created by the pneumatic force of the bellows. Furthermore, the pressure differential over the high temperature sealing surfaces 24 and 25 is moderate and any leakage has minimal impact on engine cycle efficiency. The pressure differential between the interior flowing gas and the nearly static external gas, serving to load the volute compressively, is predominantly created by the dynamic effect of the flowing gas. This pressure differential may be 10% of the inlet pressure, plus or minus 5%. The pneumatic force of the bellows is asserted by the larger pressure differential between the inlet and exit of the turbine stage.

It is intended that the disclosure be construed as including all such modifications and alterations insofar as they come within the scope of the appended claims or the equivalents thereof.

The exemplary systems and methods of this disclosure have been described in relation to a specific gas turbine engine design. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

A number of variations and modifications of the disclosure can be used. It would be possible to provide for some features of the disclosure without providing others.

For example in one alternative embodiment, the volute is formed from more than two separate parts. Any number of parts can be employed to realize the benefits set forth herein.

In another alternative embodiment, the volute is a material other than a ceramic material, such as a metal volute. This is so because the disclosure is not limited to high temperature gas turbine engines but can be applied to turbine engines operating under any thermal conditions.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A gas turbine and nozzle system, comprising:
   a radial inflow turbine rotor;
   a radial turbine shroud; and
   a volute comprising a shape conforming to a contour of the radial turbine shroud, the volute comprising at least first and second parts clamped between rings,
   wherein the first and second parts comprise a ceramic material,
   wherein the ceramic material has a thermal conductivity higher than first and second thermal barriers,
   wherein the first and second parts and the first and second thermal barriers are stacked in an axial plane and share a first turbine axis,
   wherein a mating surface between the first and second parts is aligned with a direction of an up-stream pressurized gas flow in the volute,
   wherein the first and second parts operatively engage each other along a plane which is perpendicular to the first turbine axis,
   wherein the volute provides a flow path to deliver a pressurized gas to a circumference of the radial turbine rotor.

2. The system of claim 1, wherein the mating surface between the first and second parts forms a closed volume around a tip of the radial inflow turbine rotor.

3. The system of claim 1, wherein the first and second thermal barriers correspond respectively to the first and second parts of the volute, wherein the first thermal barrier is positioned between the first part and a first bearing core, wherein the second thermal barrier is positioned between the second part and one or more of a clamp tube and a second bearing core, wherein the first thermal barrier has a lower thermal conductivity than one or more of the first part and the first bearing core, and wherein the second thermal barrier has a lower thermal conductivity than one or more of the second part and the one or more of the clamp tube and second bearing core.

4. The system of claim 3, wherein at least one of the first and second barriers comprises a channel feature to maintain an alignment of the first and second parts of the volute.

5. The system of claim 1, wherein the mating surface between the first and second parts comprises one or more holes, a dowel pin in each hole, and a slot to receive the dowel pin to enable thermal expansion and contraction of each of the first and second parts while substantially maintaining a gas seal between the first and second parts.

6. The system of claim 3, wherein the first and second parts and the first and second thermal barriers are clamped together along the first turbine axis by the clamp tube and a bellows and wherein a plane of the mating surface between the first and second parts is perpendicular to the first turbine axis.

7. The system of claim 1,
wherein the first and second thermal barriers respectively engage the first and second parts of the volute; and
wherein the system further comprises a flexible corrugated bellows duct with a low internal pressure and a high outer pressure on an outer radius of the bellows duct, wherein a pressure differential between the low internal pressure and the high outer pressure generates a pneumatic pressure force which loads the first and second parts in compression between the first and second thermal barriers.

8. The system of claim 1, wherein the volute has an internal surface and an external surface, wherein the internal surface defines a volume filled with the pressurized gas feeding the turbine rotor, and wherein the external surface experiences a higher static gas pressure than the internal surface, thereby loading the volute in compression.

9. The system of claim 1, wherein the ceramic material is silicon carbide, silicon nitride, or an oxide of aluminum, silicon, calcium, phosphorous, or lithium.

10. A gas turbine and nozzle system, comprising:
a radial inflow turbine rotor;
a radial turbine shroud;
a volute comprising a shape conforming to a contour of the radial turbine shroud, wherein the volute comprises at least first and second parts clamped between rings,
wherein the first and second parts comprise a ceramic material,
wherein the ceramic material has a thermal conductivity higher than first and second thermal barriers,
wherein the first and second parts and the first and second thermal barriers are stacked in an axial plane and share a first turbine axis,
wherein a mating surface between the first and second parts is aligned with a direction of an up-stream pressurized gas flow in the volute,
wherein the first and second parts operatively engage each other along a plane which is perpendicular to the first turbine axis,
wherein the volute provides a flow path to deliver a pressurized gas to a circumference of the radial turbine rotor,
wherein the first and second thermal barriers correspond respectively to the first and second parts of the volute, and
wherein the first thermal barrier is positioned between the first part and a first bearing core and the second thermal barrier is positioned between the second part and a second bearing core.

11. The system of claim 10, wherein the ceramic material in the first and second parts is silicon carbide, silicon nitride, or an oxide of aluminum, silicon, calcium, phosphorous, or lithium.

12. The system of claim 11, wherein the mating surface between the first and second parts forms a closed volume around a tip of the radial inflow turbine rotor.

13. The system of claim 10, wherein the first thermal barrier has a lower thermal conductivity one or more of the first part and the first bearing core and the second thermal barrier has a lower thermal conductivity lower than one or more of the second part and the second bearing core.

14. The system of claim 13, wherein at least one of the first and second barriers comprises a channel feature to maintain an alignment of the first and second parts.

15. The system of claim 10, wherein the mating surface between the first and second parts comprises one or more holes, a dowel pin in each hole, and a slot on to receive the dowel pin to enable thermal expansion and contraction of each of the first and second parts while substantially maintaining a gas seal between the first and second parts.

16. The system of claim 13, wherein the first and second parts and the first and second thermal barriers are clamped together along the first turbine axis by a clamp tube and a bellows and wherein a plane of the mating surface between the first and second parts is perpendicular to the first turbine axis.

17. The system of claim 10, further comprising:
a flexible corrugated bellows duct with a low internal pressure and a high pressure on an outer radius of the bellows duct, wherein a pressure differential between the low internal pressure and the high outer pressure generates a pneumatic pressure force which loads the first and second parts in compression between the first and second thermal barriers.

18. The system of claim 10, wherein the volute has an internal surface and an external surface, wherein the internal surface defines a volume filled with the pressurized gas feeding the turbine rotor, and wherein the external surface experiences a higher static gas pressure than the internal surface, thereby loading the volute in compression.

19. A method, comprising:
inserting a radial inflow turbine rotor through a turbine exit end of a pressure bearing housing and through a first part of a volute; and thereafter engaging the first part of the volute with a second part of the volute to enclose the radial inflow turbine rotor between the first and second parts of the volute,
wherein the volute comprises a shape conforming to a contour of a radial turbine shroud,
wherein the first and second parts are clamped between rings,
wherein the first and second parts comprise a ceramic material,
wherein the ceramic material has a thermal conductivity higher than first and second thermal barriers,
wherein the first and second parts and the first and second thermal barriers are stacked in an axial plane and share a first turbine axis,
wherein a mating surface between the first and second parts is aligned with a direction of an up-stream pressurized gas flow in the volute,
wherein the first and second parts operatively engage each other along a plane which is perpendicular to the first turbine axis,
wherein the volute provides a flow path to deliver a pressurized gas to a circumference of the radial turbine rotor.

20. The method of claim 19, wherein the radial inflow turbine rotor is aligned with and in close proximity to an integral turbine back plate.

* * * * *